April 15, 1958 A. D. ODOM 2,830,427
COTTON PICKING UNIT WITH SPECIFIC PRESSURE PLATE ASSEMBLY
Filed Feb. 11, 1957
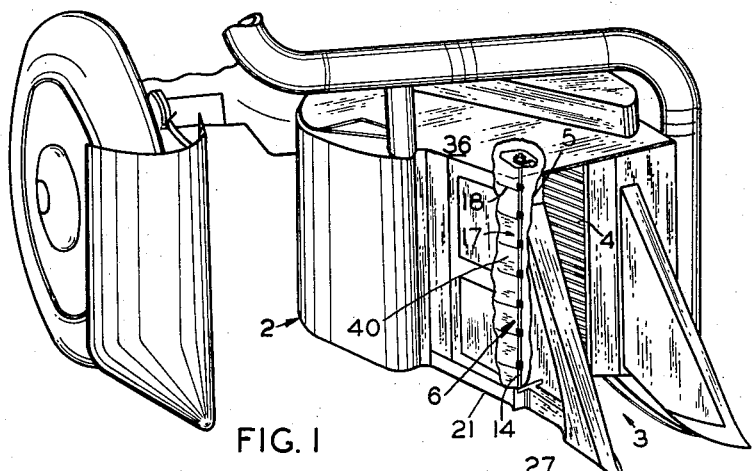
FIG. 1
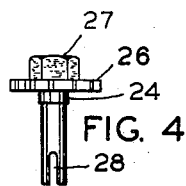
FIG. 4
FIG. 5
FIG. 6
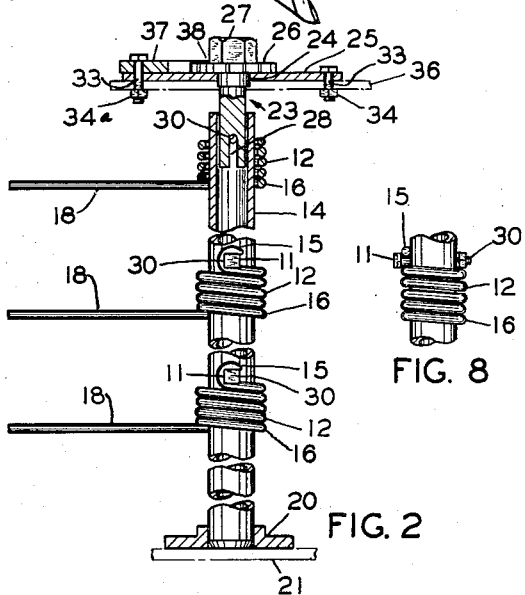
FIG. 2
FIG. 8
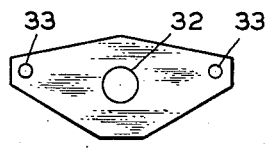
FIG. 7
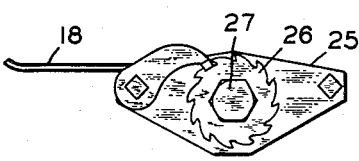
FIG. 3
Arthur D. Odom  INVENTOR.

United States Patent Office 2,830,427
Patented Apr. 15, 1958

2,830,427

COTTON PICKING UNIT WITH SPECIFIC PRESSURE PLATE ASSEMBLY

Arthur D. Odom, Chandler, Ariz.

Application February 11, 1957, Serial No. 639,258

2 Claims. (Cl. 56—44)

This invention concerns improved spring pressing elements which apply resilient pressure to the pressure plates of cotton picking machines.

It is to be understood that the invention concerns mechanical cotton pickers of the type wherein pressure plates are used to urge the plants of a cotton row against the spindles of the picker element. Mechanisms of this type are well known to those familiar with the art. This invention is confined to those machines wherein there is a pressure plate oppositely disposed to a vertically rotating picker mechanism which traverses and straddles a row of cotton plants, such as the International Harvester Company Machine and others of similar structure.

In cotton picking machines of the type such as the International Harvester Company picker wherein radially extending cotton gathering spindles spin in a rotary drum, and are rotated and rolled by the drum into the cotton plants as the machine moves forward over and along the plant rows, it is necessary to push the plants toward the spindles by means of a pressure plate which slides along the side of the plants opposite to the spindles. The pressure plate must resiliently press the cotton plants toward the spindles and to do this there are a number of spring elements attached to a vertical shaft, journalled in the machine body, and extending parallel in spaced relation to the front portion of the outer face of the pressure plate. As the machines are now made the spring elements consist of a rod of spring metal coiled several times around the vertical shaft to form a helical spring, and with a hook formed at one end to receive a bolt which extends diametrically through the shaft and holds the element in place on the shaft, while the other end of the spring rod extends tangentially from the coil substantially parallel but at a slight angle directed toward the outer face of the pressure plate so that the end portion of this spring finger contacts and presses the pressure plate toward the plants. The machines, as now built, have a number of these spring elements vertically spaced along the vertical shafts which are in back of the pressure plates.

This pressure plate mechanism, as now made and used, includes no adequate means for adjusting the vertical shafts in order to increase the tension of the spring fingers on the pressure plates. The spring elements are given a definite tension when originally assembled and any change in this tension due to use, or to misuse by accident, must be remedied by replacing the spring elements on the vertical shafts. In addition to this there is no simple way of removing the spring elements from the vertical shaft. The shaft must be entirely removed from the frame, and each element must be removed from the shaft by slipping it off the end of the shaft after it has been loosened by removal of the diametrical bolt which holds it in place. This is an inefficient and time consuming operation.

In view of the foregoing, one of the objects of this invention is to provide a spring tensioning mechanism for the pressure plates of cotton picking machines of the type mentioned, which is easily adjustable without disassembling the machine or any part of it.

Another object of the invention is to provide a vertical shaft for the pressure plate tensioning elements and springs, which has two parts arranged so that the shaft may be removed from the frame of the machine easily and quickly and without the removal of bearing members of the picking machine frame parts, and without removing the tensioning elements from the vertical shaft.

Another object is to provide the vertical shaft which carries the spring tensioning members of a pressure plate mechanism with a ratchet and pawl arrangement which is easily accessible for adjustment in a convenient position on the cotton picker frame, and which is attached to the frame so that it may be easily removed when desired in order to release the entire vertical shaft which supports the pressure plate tensioning element; said ratchet being attached to a vertical stub shaft which is detachably secured to the lower portion of the vertical shaft which carries the tensioning elements.

Other objects will appear hereinafter.

I attain the foregoing objects by means of the devices, parts, and combinations of parts shown in the accompanying drawing in which—

Figure 1 is a perspective view of the front portion of a cotton picking machine of the type herein concerned with portions of the outer casing broken away to show interior construction;

Figure 2 is a side elevation of the vertical shaft and tensioning members used in said machine to maintain pressure on the pressure plate, drawn on an enlarged scale with parts broken away and in section;

Figure 3 is a plan view thereof;

Figure 4 is a side elevational view of the removable top portion of the vertical shaft;

Figure 5 is a plan view of a pawl used in connection with a ratchet of the removable top portion of the vertical shaft;

Figure 6 is a side elevational view thereof;

Figure 7 is a plan view of the top bearing plate for the vertical shaft;

Figure 8 is a front elevational view of a fragment of the vertical shaft shown in Figure 2.

Similar numerals refer to similar parts in the several views.

Referring to Figure 1 of the drawing, 2 indicates the casing and frame of the fore portion of the cotton picker, 3 indicates the gate or front entrance of the picker through which a cotton row of plant enters the picking mechanism, 4 indicates the position of the spindles of the picking drum, 5 indicates the pressure plate, and 6 indicates generally the mechanism, here concerned, for applying pressure to the pressure plate 5.

The mechanism 6 is composed of a plurality of spring coils 12 which surround a portion of a vertical hollow tubular shaft 14 in vertically spaced relation. Each spring coil 12 has a hook or eye 15 formed at one end and secured to shaft 14 by head 11 of diametrically extending bolts 30. The other end of the spring coil 12 extends tangentially from the last convolution 16 thereof to form a tensioning finger 18.

The bottom of shaft 14 is journalled in a bearing plate 20 attached to the bottom plate and frame members 21 of the picking machine casing and frame 2. The top end of shaft 14 is hollow to receive the stub shaft 23 which supports the upper portion of the shaft 14 as shown in Figures 1 and 2. Above the stub shaft 23 there is an integral enlarged boss 24 journalled in an upper bearing plate 25. Above this, there is a circular toothed ratchet plate 26 and on top of this a hexagon head 27. The stub shaft 23, enlarged boss 24, ratchet plate 26 and head 27 are secured together by welding or brazing, or are made from one piece of material. The bottom of the stub shaft 23 is slotted to form a bifurcated lower end 28. This is positioned to key onto the diametrically extending bolt 30 holding the spring coil 12. The lower end of stub shaft 23 telescopes into the upper end of shaft 14 with the transverse bolt 30 engaged in slot 28 to prevent relative turning movement therebetween.

The top bearing plate 25 has a central hole 32 to form a bearing for the boss 24 of stub shaft 23 and two laterally disposed bolt holes 33 to receive bolts 34 and 34a to hold the bearing plate onto the top plate portion 36 of the casing 2.

The upper portion of bolt 34a forms a bearing for the pawl 37. The free end 38 of the pawl 37 engages the teeth of ratchet 26. When the stub shaft 23 is turned by the application of a wrench (not shown) to the head 27 the shaft 14 is similarly turned. Turning shaft 14 clockwise, as viewed in Figure 3, tends to press fingers 18 upon the outer face 40 of the pressure plate 5 and in this way the pressure plate 5, which is hingedly held in frame 2, is urged toward the picking spindles 4.

In use, the shaft 14 with spring coils 12 in place is installed in the case and frame 2 by first setting the lower end of the shaft 14 in lower bearing plate 20 and then inserting the stub shaft 23 through upper bearing plate 25. Tension of the spring coils 12 is then provided by rotating ratchet 26 clockwise by means of a wrench (not shown) applied to head 27, and by holding the position attained by means of pawl 37. Proper resilient urge is then provided by either tightening or releasing the spring tension. This easy method of tensioning saves hours of down time usually consumed in installation and tensioning the tensioning means heretofore used.

Likewise, when the installation of new spring coils 12 is required, the stub shaft 23 is removed upward, upper bearing plate 25 being removed, if desired, and the shaft 14 is then merely tilted outward from the frame 2 and the lower end pulled upward and out of the lower bearing 20. Down time for repair of the device is greatly shortened by reason of the structure and arrangement of parts.

It has been found that the efficiency of the picking machine and its operation can be greatly improved by accurately adjusting the tension of the pressure plate 5. Thus, for rows of cotton plants having generally large thick stalks, the tension is increased so as to bring all parts of the plant within reach of the spindles. For rows having generally light stalks the pressure is released so that the stalks are not excessively crushed and broken. This minimizes formation of trash.

Variations in tension can also improve picking efficiency where the stalks are green or dry. Green stalks require greater pressure plate tension. Dry stalks should be given less tension.

In all cases the tension is easily varied by means of the ratchet and pawl mechanism. Cleaner cotton results, and a more thorough picking of the stalks is made possible. The tension adjustments necessary to do this can be made by the devices above described that were not possible with the structure and devices heretofore used.

I claim:

1. In a cotton picking machine of the type having a frame and case, a vertically extending picking drum with a plurality of picking spindles extending radially therefrom operating in said case, and a pressure plate disposed in said case to press cotton plants toward said picking spindles; a mechanism for resiliently pressing said pressure plate against cotton plants as they pass through said picking spindle comprising, a vertically extending hollow tubular shaft having its lower end journalled in said frame, a vertically extending stub shaft journalled in said frame with the lower end thereof telescoped into the upper end of said tubular shaft, said stub shaft having its lower end bifurcated, a diametrically extending bolt in said tubular shaft extending through the bifurcation of said stub shaft to prevent rotation thereof with respect to said tubular shaft, a ratchet fixed to the upper end of said stub shaft, a pawl pivotally mounted on said frame engaging said ratchet to permit rotation of said stub shaft in one direction and prevent rotation in the other direction, a head fixed to said stud shaft above said ratchet, and a plurality of coil springs detachably secured to said tubular shaft in vertically spaced relation, said springs each having an integral finger tangentially extending from said shaft with its free end engaging said pressure plate, said springs being arranged so that rotation of said tubular shaft in the direction permitted by said pawl will increase the tension on said spring fingers toward said pressure plate.

2. In a cotton picking machine of the type having a frame including a case at its forward end having an entrance opening for the plants of a cotton row, a picking mechanism including a vertical picking drum having a plurality of radially operating spindles operating at one side of said entrance opening, and a pressure plate hingedly mounted on said frame at the opposite side of said entrance opening to press the cotton plants entering said opening toward said drum; a tensioning mechanism for said pressure plate comprising, a vertically extending shaft having its lower end journalled in said case, a vertically extending stub shaft having its lower end telescoped in said shaft, a bearing plate removably attached to the upper part of said case journalling the upper end of said stub shaft so that the upper end of said stub shaft is accessibly exposed on said case, a ratchet fixed on the upper end portion of said stub shaft, a pawl pivotally mounted on said bearing plate engaging said ratchet to permit tightening rotation thereof in one direction and prevent rotation thereof in the opposite direction, a head fixed to said ratchet, a plurality of vertically spaced coiled tensioning springs encompassing said shaft, said spring having one end of said coil detachably secured to said shaft and the other end forming a finger extending substantially tangentially from said shaft toward said pressure plate and resiliently pressing thereagainst, and means between said shaft and said stub shaft cooperating to prevent their relative rotation, said tensioning springs being arranged so that rotation of said shaft in the direction permitted by said ratchet and pawl will increase the tension of said spring fingers on said pressure plate.

References Cited in the file of this patent

UNITED STATES PATENTS

| | | |
|---|---|---|
| 211,266 | Schroder | Jan. 7, 1879 |
| 675,041 | Haldeman | May 28, 1901 |
| 1,085,657 | Appleton | Feb. 3, 1914 |
| 1,090,562 | Orr et al. | Mar. 17, 1914 |
| 1,457,714 | Montagna | June 5, 1923 |
| 1,786,851 | Johnston et al. | Dec. 30, 1930 |
| 1,926,337 | Johnston | Sept. 12, 1933 |
| 2,025,514 | Johnston | Dec. 24, 1935 |
| 2,140,631 | Johnston | Dec. 20, 1938 |
| 2,200,464 | Berry | May 14, 1940 |
| 2,644,286 | Nisbet | July 7, 1953 |